Dec. 14, 1943.  O. P. LUETSCHER  2,336,993
METHOD OF OPERATING REGENERATIVE FURNACES AND FURNACE CONSTRUCTION
Filed Jan. 23, 1941
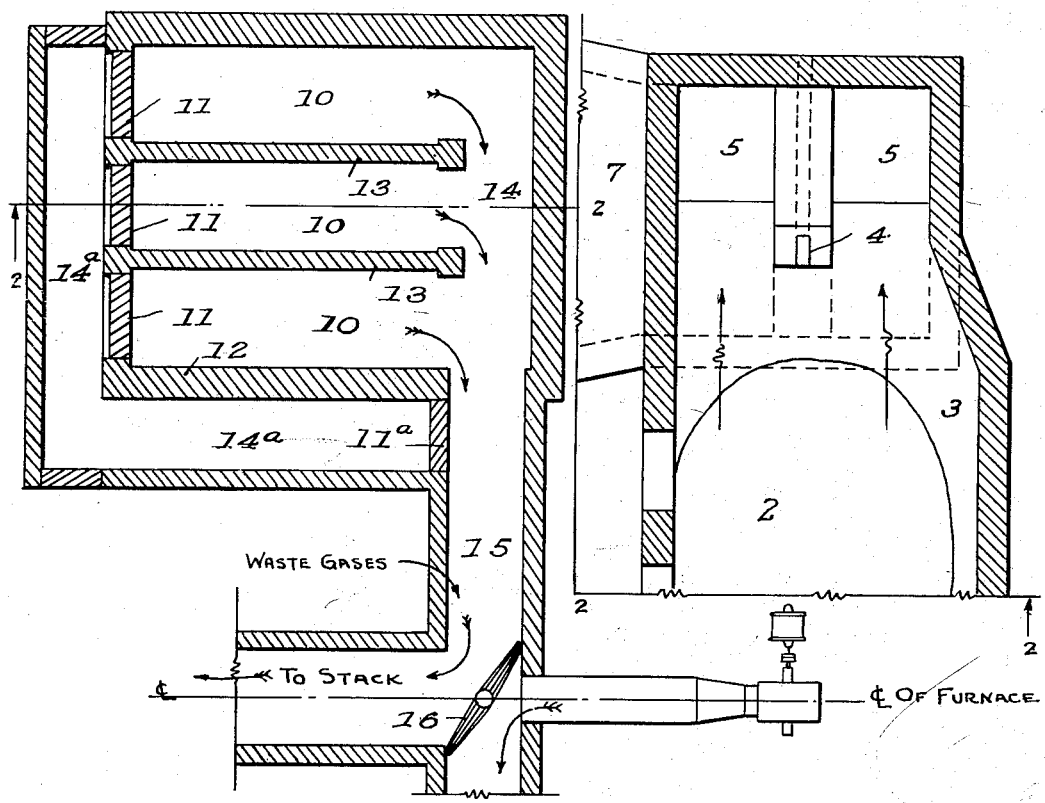
Fig. 1.
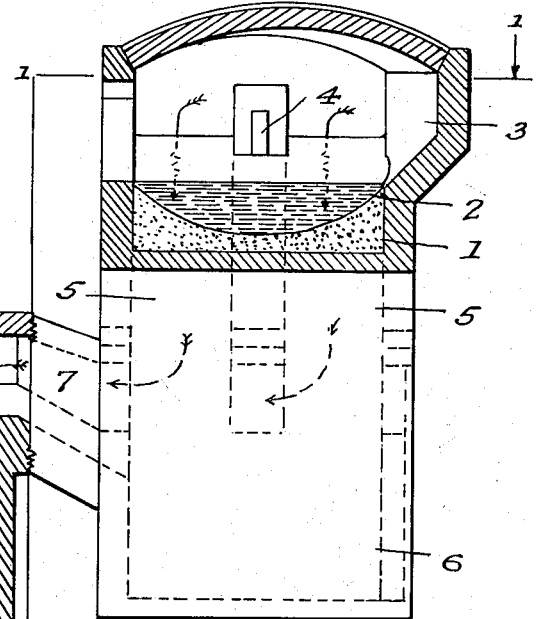
Fig. 2.
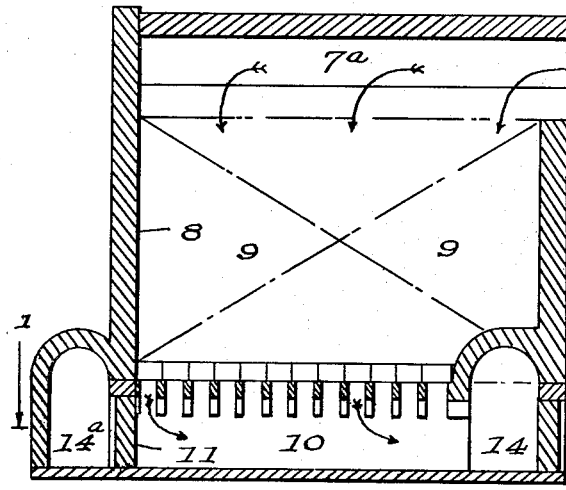
INVENTOR
BY
ATTORNEY Patented Dec. 14, 1943

2,336,993

UNITED STATES PATENT OFFICE 2,336,993

METHOD OF OPERATING REGENERATIVE FURNACES AND FURNACE CONSTRUCTION

Oliver P. Luetscher, Tiskilwa, Ill.

Application January 23, 1941, Serial No. 375,696

11 Claims. (Cl. 263—15)

This invention has reference to regenerative furnaces and in particular to the regenerative chambers thereof containing the checker work.

The invention has for its principal object to improve the method of travel of the waste gases through the regenerative chambers, whereby to cause the waste gases to distribute themselves uniformly throughout the area of the checkers.

It is a further object of the invention to improve the construction of the regenerative chambers, whereby to facilitate the travel of the waste gases therethrough to the end that the waste gases will distribute themselves uniformly throughout the area of the checkers.

The drawing discloses an open hearth furnace of usual design for liquid fuel; however, the invention is applicable to any type of regenerative furnace using any type of fuel, as will be readily understood by those skilled in the art of constructing and operating such furnaces.

In the drawing—

Fig. 1 shows, more or less diagrammatically, in plan, one half of an open hearth furnace which is symmetrical about its center line, and as the same would appear if taken on the line 1—1 of Fig. 2, and Fig. 2 is a vertical sectional view, as the same would appear if taken on the line 2—2 Fig. 1.

Like characters of reference denote corresponding facts throughout the figures.

Referring to the drawing, 1 is the hearth of the furnace on which a bath of metal 2 is melted by flame which is developed in the furnace chamber 3 from fuel which is introduced through suitable burners, not shown, disposed in the burner ports 4 at either end of the furnace, alternately, as is the practice in operating all furnaces of this character. In the drawing the fuel is assumed to be coming in through the burner port at the right hand end of the furnace. The products of combustion pass through the furnace chamber 3, as indicated by the arrows, and out through the down takes 5 into the slag pocket 6 and from thence through the fantail 7 into the space 7ª at top of the regenerator chamber 8. From this space in the top of the regenerator chamber above the checkers 9, which fill the middle of the chamber, as indicated by the cross lines, the gases are drawn down through the checkers into the spaces 10 at the bottom of the chamber. All of this is exactly in accordance with the common practice of design and operation of regenerative furnaces.

In the furnaces which have been built to date the gases are then drawn to the stack through a flue 14ª which connects to the end of the chamber farthest from the fantail 7 generally through openings located at the points occupied by bulkheads 11 or sometimes through openings located in the side wall 12 of the regenerator chamber 8, in which case the rider walls 13 are arranged transversely to the chamber instead of longitudinally as in the chamber shown.

However, in my invention as shown, the waste gases are drawn from the spaces 10 into a cross flue 14 located at the same end of the chamber as the fantail 7 and from this flue 14 pass through a suitable flue 15 and reversing valve 16 to the stack. This reversing valve may be of any suitable design and the flues may be arranged in any suitable manner, as will be understood by those skilled in the art of building and operating regenerative furnaces.

In the operation of regenerative furnaces of the types now in use the velocity of the gases entering the chamber 8 from the fantail 7 forces them to flow to the far end of the chamber where their impact against the wall changes their velocity energy into pressure head and starts them downward through the checkers. We find by experiment that their downward course is then substantially vertical until they reach the bottom of the chamber 10. In the common type of checker where the connection to the stack is at the far end, the vacuum in the passages 10 is greatest at the far end where the impact pressure of the gases in the space 8 is highest. Consequently, the gases in their passage through the checkers concentrate at the far end and I have found by experiment that in checker chambers of usual design approximately 50% of the gases will pass down through about 15% of the checkers at the far end and the balance of the gases will pass down through about 35% of the checkers, so that substantially all of the gases will pass down through about 50% of the checkers. The remaining 50% of the checker work is occupied by practically stagnant or slowly re-circulating gases and not actively in contact with the outgoing hot gases. There is generally an upward current in the checkers at the entering end.

In my invention, as will be seen from the drawing, the highest vacuum, due to stack draft, is at the end of the passages 10 where they connect with flue 14 and the lowest vacuum is at the far end of the chamber. This arrangement tends to equalize the flow through the checkers because the motive force which is the algebraic sum of the pressure heads above and below the checkers, is equalized because the highest pressure head above the checkers is opposite the lowest vacuum below and vice versa. I have found by experiment that the proportions of the flues and passages can be made so that the gases actually distribute through the entire volume of the checkers.

It is well known that in the operation of a regenerative furnace the flow of fuel and gases is reversed at intervals so that the gases will flow out through the passages and chambers through which the air has been entering and the air will then flow in through the passages which had been traveled by the waste gases. In the usual type of furnace, the air will then enter the passages 10 from the far end and will, by its velocity, be carried to the end of the chamber before flowing upward through the checkers. The vacuum above will be highest at the fantail end and cause the concentration of the air flow in the passages farthest from the point of entrance. This causes the air to flow through the checkers which had the least contact with the hot waste gases in the previous part of the cycle.

In my invention the air will enter through the passage 14 and its velocity will carry it to the point of the checkers that have been most actively swept by the hot gases. This will cause a better utilization of the checker chamber, and tend to offset any remaining errors in distribution.

In the operation of a commercial installation of my invention I have found a very substantial reduction in the fuel consumption of the furnace over that of an exactly similar furnace with regenerator chambers of identical size, but without the improved construction and method of operation embodied in this invention. The results obtained would indicate an increased utilization of checker capacity resulting in decrease of the temperature of the gases leaving the regenerators and a corresponding increase in the temperature of the preheated air passing to the furnace chamber as stated in this specification.

A further point of improvement of my invention over the methods and constructions used to date is, in the fact that the dust accumulation under the checkers which is greatest at the far end does not interfere with the flow of gases to the stack or the entrance of air, so that longer campaigns can be made without cleaning the passages 10. This statement is also borne out by observation on a commercial installation of this invention.

In the course of a long operating campaign of a furnace, conditions of leakage in the checker roof above the space 7ª and dust deposits in the space 10 may disturb the relations of the various elements bearing on the operation of this chamber and make it advantageous to use both flues 14 and 14ª to secure equalization of the gas flow throughout the checkers.

For this reason I have found it most advantageous to begin the operation of the furnace with flue 14ª completely blocked off by the removable bulkheads 11 which may be located as shown or at any other convenient point in the gas passages, for example 11ª, and then removing part of this obstruction when this seems to be indicated.

It will be readily understood that the flues 14 and 14ª or either of them can be constructed entirely within the chamber or without the chamber without departing from the spirit of this invention.

What I claim is:

1. In an open hearth regenerative furnace, in combination, a combustion chamber, regenerative chambers arranged on each side of the combustion chamber and having checkerwork therein, a gas-receiving chamber above each checkerwork, a passage leading from the combustion chamber to each of said gas-receiving chambers, a gas-receiving chamber below the checkerwork, and a flue leading from each end of the lower gas-receiving chamber to effect circulation of the waste gases throughout the checkerwork.

2. In an open hearth regenerative furnace, in combination, a combustion chamber, regenerative chambers arranged on each side of the combustion chamber and having checkerwork therein, a gas-receiving chamber above each checkerwork, a passage leading from the combustion chamber to each of said gas-receiving chambers, a gas-receiving chamber below the checkerwork, a flue leading from each end of the lower gas-receiving chamber, and means for controlling the relative amount of gas withdrawn through each flue to effect circulation of the waste gases throughout the checkerwork.

3. The method of operating a regenerative chamber containing checkerwork which consists in introducing the waste gases into said chamber through an opening in one side wall communicating with a space above the checkerwork, and causing the gases to uniformly pass downwardly throughout the checkers by regulating the withdrawal of the gases at different points within a space arranged below the checkerwork.

4. The method of operating a regenerative chamber containing a checkerwork which consists in introducing the waste gases into said chamber through an opening in one side wall communicating with a space above the checkerwork with a predetermined velocity, causing the gases to pass downward through said checkerwork into a space below the checkerwork, and varying the pressure at different points in said space below the checkerwork in relation to the pressure and velocity in the space above the checkerwork to cause the waste gases to distribute themselves uniformly throughout the checkers.

5. The method of operating a regenerative chamber containing a checkerwork which consists in introducing the waste gases into said chamber through an opening in one side wall communicating with a space above the checkerwork with a predetermined velocity, causing the gases to pass downward through said checkerwork into a space below the checkerwork, and controlling at different points in the lower space the amount of waste gases withdrawn from the lower end of corresponding sectional areas of the checkerwork to cause uniform distribution of the waste gases throughout the checkers.

6. The method of operating a regenerative chamber containing a checkerwork which consists in introducing the waste gases into said chamber through an opening in one side wall communicating with a space above the checkerwork with a predetermined velocity, causing the gases to pass downward through said checkerwork into a space below the checkerwork, and controlling the flow of waste gases at different points in said space below the checkerwork to cause a uniform distribution of the waste gases throughout the checkers.

7. In a regenerative furnace, a regenerative chamber having checkerwork therein and into which waste gases are introduced in the space above the checkerwork and withdrawn from the lower part of the chamber below the checkerwork, said regenerative chamber being so constructed and arranged that the pressure differential between the vertically aligned points in the upper part of the chamber above the checkerwork and the bottom part of the chamber below the checkerwork, is substantially equal throughout the area of the checkerwork.

8. The method of operating a regenerative chamber containing checkerwork, which consists in introducing waste gases above the checkerwork from one side of said chamber and directing the same transversely thereof, withdrawing the gases from below the checkerwork, and substantially equalizing the pressure differential between relatively aligned points in the zone above the checkerwork and in the zone therebelow to insure the flow of the waste gases throughout substantially all portions of the checkerwork.

9. In a regenerative furnace, a regenerative chamber having checkerwork therein and into which waste gases are introduced in the space above the checkerwork, and means facilitating withdrawal of the gases from the lower part of the chamber, said regenerative chamber and said means being so correlated that the pressure differential between the upper part of the chamber and the lower part of the chamber, is such as to insure the flow of gases throughout substantially the entire area of the checkerwork.

10. In a regenerative furnace, a regenerative chamber having checkerwork therein with spaces above and below the checkerwork, said chamber having an intake opening for waste gases communicating with the space above the checkerwork, and an outlet flue at each end of the chamber leading from the space in the chamber below the checkerwork to affect a substantial uniform circulation of the waste gases throughout the checkerwork.

11. In a regenerative furnace, a regenerative chamber having checkerwork therein with spaces above and below the checkerwork, said chamber having an intake opening for waste gases communicating with the space above the checkerwork, an outlet flue at each end of the chamber leading from the space in the chamber below the checkerwork, and means for controlling the relative amount of gas withdrawn through each outlet flue to affect circulation of the waste gases throughout the checkerwork.

OLIVER P. LUETSCHER.